(12) United States Patent
Habetha et al.

(10) Patent No.: US 8,045,494 B2
(45) Date of Patent: Oct. 25, 2011

(54) SYSTEM AND METHOD FOR HIBERNATION MODE FOR BEACONING DEVICES

(75) Inventors: Joerg Habetha, Aachen (DE); Javier Del Prado Pavon, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1021 days.

(21) Appl. No.: 10/597,433

(22) PCT Filed: Feb. 4, 2005

(86) PCT No.: PCT/IB2005/050472
§ 371 (c)(1),
(2), (4) Date: Jul. 25, 2006

(87) PCT Pub. No.: WO2005/076545
PCT Pub. Date: Aug. 18, 2005

(65) Prior Publication Data
US 2008/0232286 A1    Sep. 25, 2008

Related U.S. Application Data

(60) Provisional application No. 60/542,529, filed on Feb. 6, 2004, provisional application No. 60/633,227, filed on Dec. 3, 2004.

(51) Int. Cl.
*G08C 17/00* (2006.01)
(52) U.S. Cl. ........ 370/311; 370/252; 370/312; 370/318; 370/432; 370/329; 370/328; 370/338; 455/41.2; 455/343.2; 455/343.3; 455/343.4; 455/574

(58) Field of Classification Search .................. 455/574, 455/522, 41.2, 343.2, 343.3, 343.4; 370/311, 370/318, 312, 432, 229, 252, 254, 321, 337, 370/338, 347, 442
See application file for complete search history.

(56) References Cited

U.S. PATENT DOCUMENTS
5,392,287 A  *  2/1995  Tiedemann et al. .......... 370/311
(Continued)

FOREIGN PATENT DOCUMENTS
EP   1193985 A   4/2002

OTHER PUBLICATIONS
IEEE 802.16e Sleep Mode, by Itzik, Kitroser et al., Mar. 11, 2003, pp. 1-9.

*Primary Examiner* — Olumide T Ajibade Akonai
(74) *Attorney, Agent, or Firm* — Larry Liberchuk

(57) ABSTRACT

A system (400), device (500) (401), and method are provided for power saving in a wireless communication network (400), where all devices (401$_i$) regularly transmit a beacon (600) but can enter a hibernation mode in which they do not transmit beacons (600) and operate in a power-saving state. A device (400) announces the start (303) and duration (304) of the hibernation period in its beacon (600) prior to its hibernation period. The neighboring devices (401$_j$) keep information on the presence of the beacon (600) of the hibernating device (401) in their own beacons (600) in order to block the beacon slot (204) for the hibernating device (401) during its sleep time. Devices (401$_j$) furthermore include an information element (604) in their beacons (600) that contains all receiver addresses for which a device (401$_i$) has data pending to be sent.

15 Claims, 6 Drawing Sheets

| | 1 | 1 | 1 |
|---|---|---|---|
| 304 | 303 | 302 | 301 |

300

U.S. PATENT DOCUMENTS

| | | | |
|---|---|---|---|
| 5,590,396 A * | 12/1996 | Henry | 455/426.1 |
| 5,924,017 A * | 7/1999 | Pinter et al. | 340/7.36 |
| 6,463,307 B1 * | 10/2002 | Larsson et al. | 455/574 |
| 6,480,476 B1 * | 11/2002 | Willars | 370/311 |
| 7,127,254 B2 * | 10/2006 | Shvodian et al. | 455/450 |
| 7,496,064 B2 * | 2/2009 | Kupershmidt | 370/321 |
| 2004/0264397 A1 * | 12/2004 | Benveniste | 370/311 |
| 2005/0043027 A1 * | 2/2005 | Emeott et al. | 455/435.1 |
| 2005/0124313 A1 * | 6/2005 | Simpson et al. | 455/343.3 |

\* cited by examiner

SYSTEM AND METHOD FOR HIBERNATION MODE FOR BEACONING DEVICES

This application claims the benefit of U.S. Provisional Application Ser. No. 60/542,529, filed Feb. 6, 2004 and U.S. Provisional Application Ser. No. 60/633,227, filed Dec. 3, 2004, both of which are incorporated in whole by reference.

The present invention relates to networks with common access to a shared medium. More particularly, the invention relates to wireless networks and especially so-called Wireless Personal Area (WPAN) networks. Most particularly, the present invention relates to a hibernation mode for beaconing devices.

In most wireless networks one device periodically transmits a beacon frame. The device that sends out the beacon frame is usually the Access Point or Base Station of the network. The main purpose of the beacon frame is to provide for a timing structure on the medium, i.e., the division of time into so-called superframes, and to allow the devices of the network to synchronize with the beacon. This approach is employed in most Wireless Local Area Networks (WLAN) such as IEEE 802.11 but also in WPANs such as Bluetooth.

The disadvantage that is associated with the single beacon approach is that it implies a centralized network architecture. The device that transmits the beacon is automatically a central control point for the network. There are some approaches, such as in the ad hoc mode of the IEEE 802.11 standard, in which the beacon generation is decentralized by alternately permitting different devices to transmit the beacon in subsequent superframes. However, even with such an approach, during a superframe the beacon is still generated by a single device and beacon generation is thereby centralized.

This is why in an associated invention that has been filed together with the present invention the authors of both inventions have disclosed a method and system in which all devices in the network transmit their own beacon frame in every superframe. Only in a special mode of operation, the so-called hibernation mode, which is described in the present invention, devices are allowed to suspend the transmission of beacon frames for certain periods of time for power saving reasons. The associated invention covers the basic beaconing mechanism.

According to this associated invention, the devices use beacons transmitted in superframes to establish and maintain wireless personal area networks and communications therein. Referring to FIG. 1, in order to maintain coordination between communicating devices using distributed protocols, all devices are required to regularly transmit a beacon 103. In order to transmit/receive beacons 103 within an area, devices reserve a period of time called a beacon period (BP) 101 strictly for beacon transmission and reception. The size of the BP can be fixed or dynamic.

The basic timing structure in this beaconing wireless network is a superframe 100 of fixed length. Referring now to FIG. 2, the superframe 100 is typically composed of a certain number of Medium Access Slots (MAS) 203. Several slot types are possibly defined depending on how the MAS 203 are utilized by the device or devices nearby. In the meantime, this beaconing system has been adopted by the Multi-Band OFDM Alliance (MBOA) for its new Medium Access Control (MAC) specification. The parameters chosen by MBOA are a superframe 100 length of 65,536 usec as well as 256 Medium Access Slots (MASs) 203 per superframe, which are numbered from 0 to 255.

Before communication can be established, a device must create its own beacon group or join an existing beacon group. For each beacon phase 101 (also known as a beacon period or BP), consecutive MASs 203 are utilized as beaconing slots 204, where all the devices transmit their beacons 105. The start time of a superframe 100 is determined by the beginning of a beacon period 101 and is defined as a beacon period start time (BPST) and MASs 203 are numbered relative to this starting time. When a device initiates a new beaconing group, it defines the superframe boundary at any timeslot that does not collide with other beaconing groups' timeslot reservations.

Wireless devices, such as those communicating using superframes, have limited power resources and need a power management protocol designed for these devices to conserve power.

The system and method of the present invention provides wireless devices with a Power Management (PM) protocol comprising an "Active Mode" and a "Hibernation Mode" for conservation of energy. Referring now to FIG. 4, it is important for wireless devices $401_i$ using a distributed protocol to communicate over a shared medium 410 to be able to conserve battery power, and one of the best methods for extending battery life is to enable the devices $401_i$ to completely turn off or reduce power whenever possible. The system and method of the present invention provides for both short and long periods of time (relative to the duration of a superframe) during which a device $401_i$ can completely turn off or reduce its power consumption. A "Standard Power-Save State" allows an "Active Mode" device having no data to send or receive in the current superframe 100 to either completely turn off or reduce its power usage until the start of the next superframe 100, i.e., the start of the next beacon period 103 for the beacon group of the device.

Referring now to FIGS. 3A-B, 4 and 6, in the system and method of the present invention, a Traffic Indication Map Information Element (TIMIE) 350 is sent in a beacon frame 600 as an Information Element 604 by a device in "Active Mode" to indicate to recipient devices that it has data in its transmission queue waiting to be sent to other devices of the wireless network 400.

According to the present invention, devices $401_i$ of the wireless network 400 that have no data either to send or receive can also enter a "Deep Power-Save Mode," called "Hibernation Mode," for a fixed number of succeeding superframes 100. A device $401_i$ signals that it is going to enter "Hibernation Mode" by including a Hibernation Mode Information Element 300 in its beacon 600 as one of the Information Elements 604. The number of superframes during which the device plans to be in "Hibernation Mode" can either be a previously agreed to number of superframes or an announced number of superframes included as Hibernation Duration 304 in a Hibernation Mode Information Element 300. A device may also start to announce the hibernation phase several superframes before the start of the hibernation.

In a preferred embodiment, each device $401_i$ in the so-called "Active Mode" is in the "Awake State" during the BP of the superframe 100, sends its beacon in its slot of the BP, completes its own transmissions, and can then go into a "Standard Power-save/Sleep State" for the rest of the superframe in case that it is not mentioned as a receiver of planned transmissions of other devices. Thus, devices $401_i$ in "Active Mode" can fall asleep after their own transmission/reception until the beginning of the next beacon phase, i.e., enter "Standard Power-Save State." If there are no frames to be sent or received during a superframe, the device can immediately go into the sleep state.

Devices $401_i$ can also enter a "Hibernation Mode." In this power-saving mode, devices $401_i$ can fall asleep for more than one superframe in a row without waking up for the intermediate beacon phases and thus they do not transmit beacons while in the "Hibernation Mode." For this purpose, a device $401_i$ signals in its beacon by including a Hibernation Mode Information Element 350 including a Hibernation Duration 304 equal to the number of succeeding superframes during which the device $401_i$ will not listen to the beacon phase and will not send its own beacon. The device $401_i$ may include the Hibernation Mode Information Element in its beacon for several consecutive superframes prior to the beginning of the hibernation phase and announce the beginning of the hibernation phase in the Hibernation Information Element. The devices that receive the beacon, including the Hibernation Mode Information Element 350 of the device $401_i$ entering the "Hibernation Mode," store this information in a Device Hibernation Table 509 of their memory 508 and do not attempt any data transmissions directed to the sleeping device during its sleep phase. Furthermore, the other devices include the beacon of the sleeping device in the "beacon position occupancy field" in their own beacon, even though no beacon from the sleeping device was received. The reason for doing so is that new or moving devices should not take over the beacon position of the sleeping device.

A device in "Hibernation Mode" does not announce any planned activities, i.e., reservations, in its beacon in the first superframe 100 after emerging from its hibernation phase, and does not attempt any transmissions in this first superframe 100. This restriction is required in order to ensure that a device in "Hibernation Mode" first updates its knowledge about existing activities of other devices before undertaking any of its own activities. Alternatively, the hibernating device can start listening again to the beacons of other devices already one or several superframes before the end of the hibernation phase. This means that devices are in a "Deep Power-Save State" during most of the hibernating time, but can also go back into the "Awake State" a few frames before the end of the hibernating phase. Note that there may be no difference between the "Standard Power-Save State" and the "Deep Power Save-State" of the device (depending on the implementation). Therefore, these two states may also simply be considered as a "Sleep State" of the device.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 4:
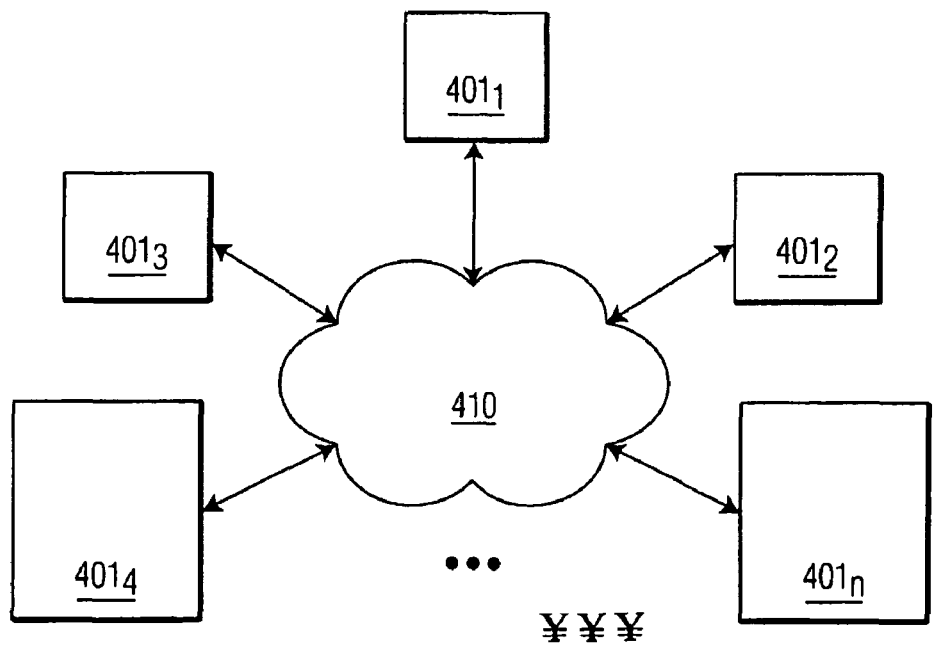
FIG. 4 illustrates a wireless network of devices modified according to the present invention.

FIG. 4 illustrates a representative wireless personal area network 400 whereto embodiments of the present invention are to be applied. The networks include a plurality of wireless personal communication devices 401. In the traditional approach, each device 401 can join any ad hoc network within its radio range 402 and therefore can participate in more than one BP.

Figure 5:
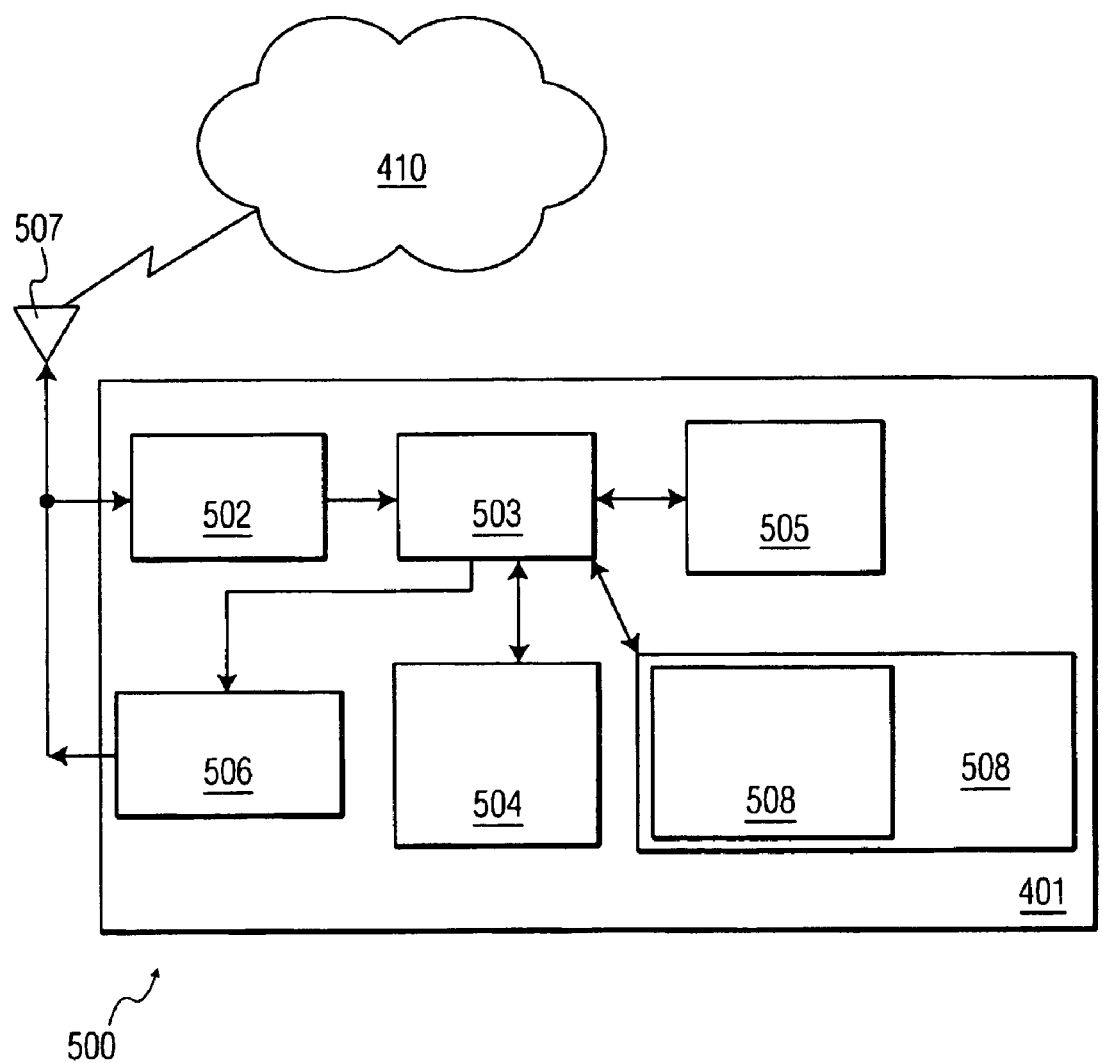
FIG. 5 illustrates a device modified according to the present invention.
Figure 6:
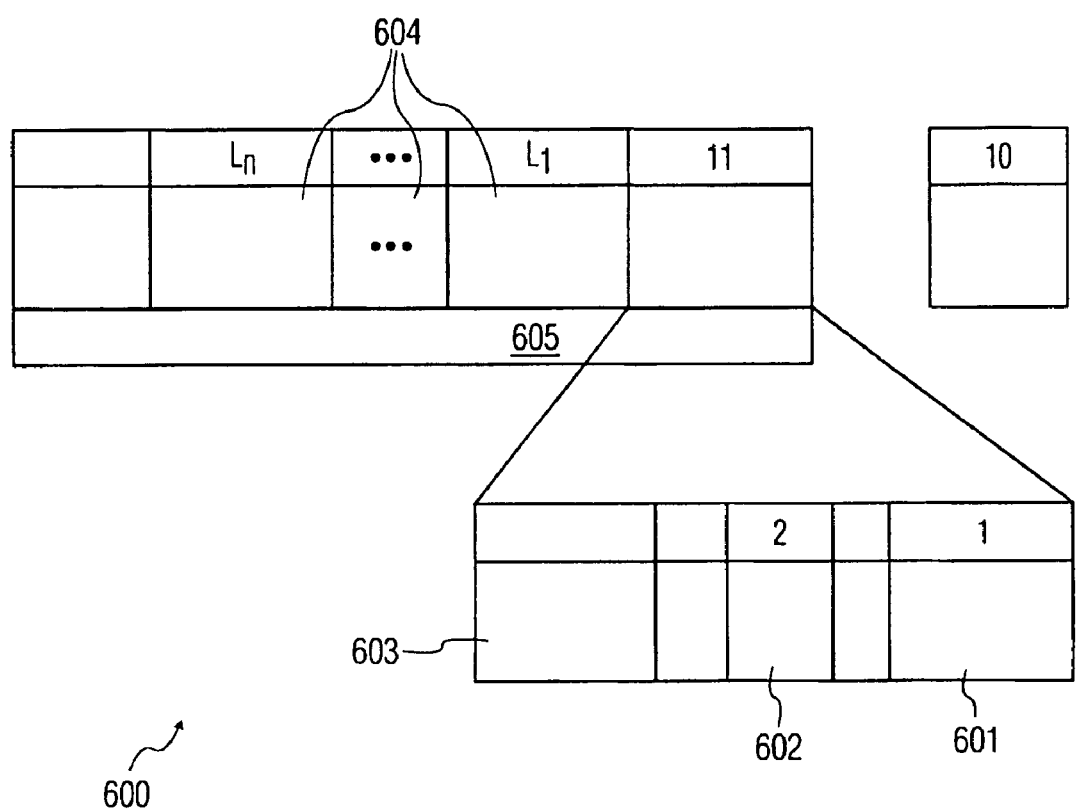
FIG. 6 illustrates a beacon frame format.

Each wireless device 401 within the WPAN 400 shown in FIG. 4 may include a system including an architecture that is illustrated in FIG. 5. As shown, each wireless device 401 may include an antenna 507 coupled to a receiver 502 and transmitter 506 that communicates over the wireless medium 510. The devices 401 each further comprise a processor 503, a Beacon Processing Module 504, the processor coupled to a beacon bitmap 505, and a device hibernation table 509 of a memory 508. For example, in a device the processor 503 is configured to receive from the receiver 502 a beacon frame 601 including one or more Information Elements 604 comprising Hibernation Information Elements 300 and to process the beacon frame 600 using the Beacon Processing Module 504 to determine, i.e., the devices of the beacon group and their hibernation characteristics, and store them in the device hibernation table 509. In a device 401, the processor 503 is further configured to use the Beacon Processing Module 504 to perform the PM protocol of the present invention.

Beacon slots for hibernating devices are marked as busy, and their information included in the Beacon Period Occupancy IEs in beacons sent by devices in "Active Mode," while the devices corresponding to the BPOIEs are hibernating in the "Hibernation Mode." Hibernating devices indicate the number of superframes that the device will be in the "Hibernation Mode" in their beacon(s) that announced their intention to hibernate.

Beacon slots for hibernating devices are marked as idle in the beacon bitmap 505 when a beacon 105 has not been received in the device's slot 303 during mMaxLostBeacons consecutive superframes 100 after the hibernating device is scheduled to send a beacon 105, i.e., after Hibernation Duration+mMaxLostBeacons has passed without the hibernating device sending its beacon.

The system and method of the present invention enables a long operation time for battery-powered DEVs by using the best method for extending the battery life, i.e., by enabling devices $401_i$ to turn off completely or reduce power for long periods of time, where a long period is relative to the superframe duration.

In a preferred embodiment, the system and method of the present invention provides two Power Management (PM) Modes in which a device can operate, namely, a "Active Mode" and a "Hibernating Mode," and three power states in which a device can be, namely "Active," "Standard Power-Save," and "Deep Power-Save." Devices operating in the "Active Mode" transmit and receive beacons in every superframe. After they have sent or received frames during the Data Transmission Phase of the superframe they can go into the "Standard Power Save-State," i.e., sleep until the beginning of the next superframe. Devices operating in the Hibernation Mode do not transmit and receive beacons during their sleep/hibernation phase. This means that hibernating devices may be in a deep sleep state for more than one superframe without waking up for the intermediate beacon phases. Depending on the implementation, there may be no difference between the Standard Power-Save and the Deep Power-Save states, in which case this state may simply be considered as the Power-Save or Sleep state.

Figure 1:
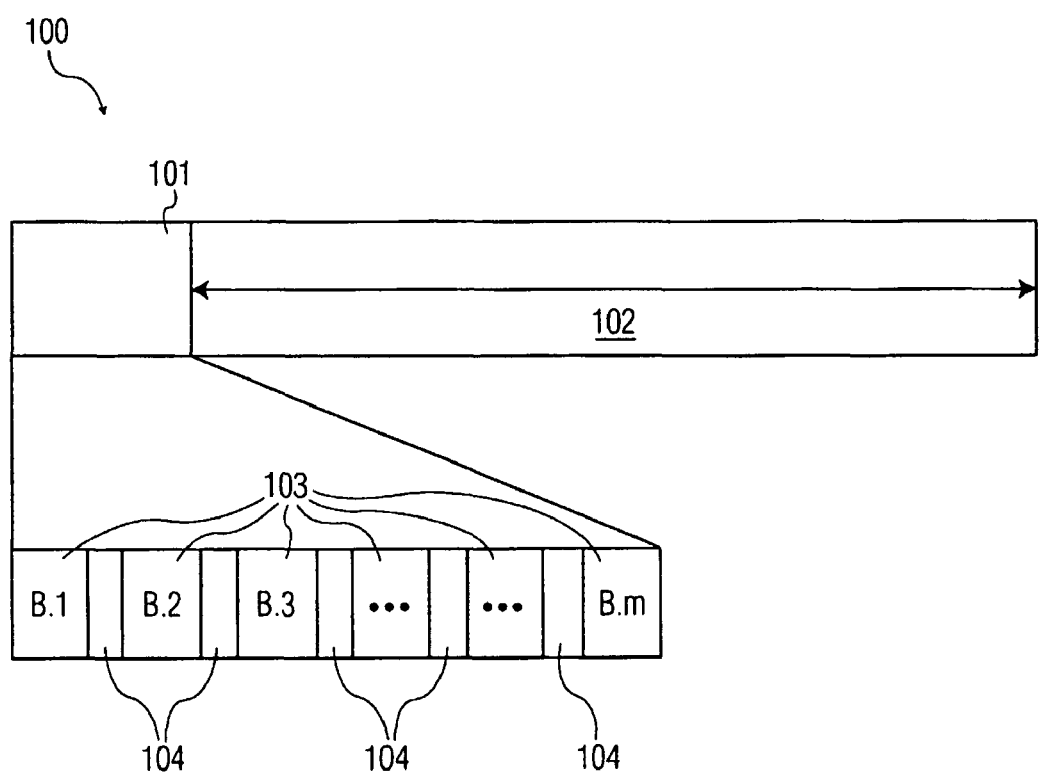
FIG. 1 illustrates a superframe layout.
Figure 2:
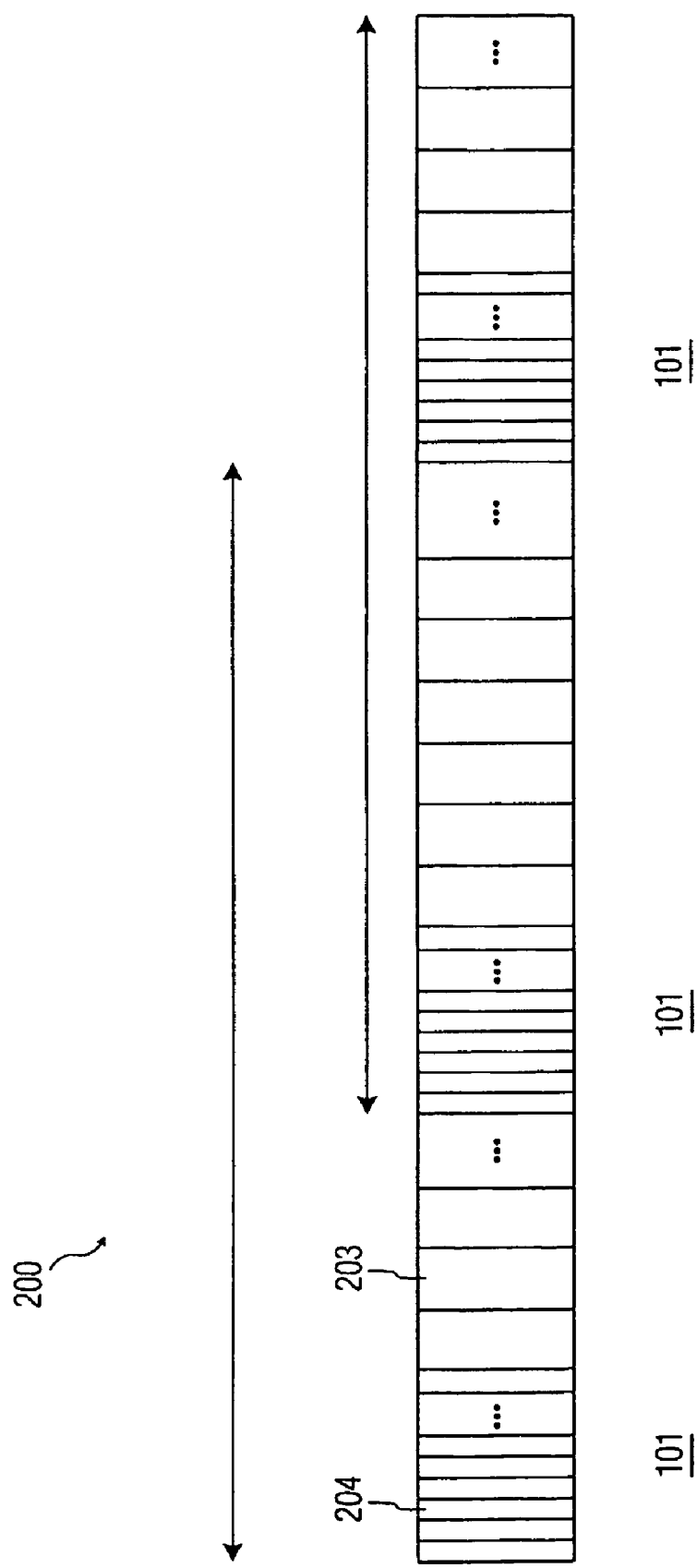
FIG. 2 illustrates a superframe structure wherein multiple groups beacon together on the wireless medium.
Figure 3A:
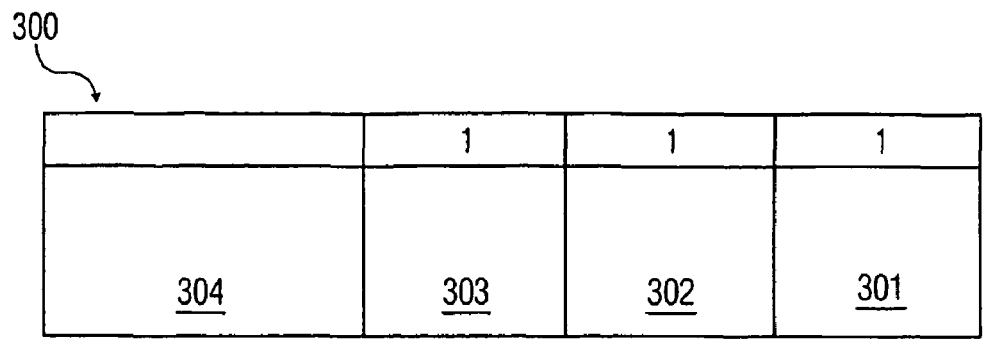
FIG. 3 illustrates a format of Hibernation Information Element.
Figure 3B:
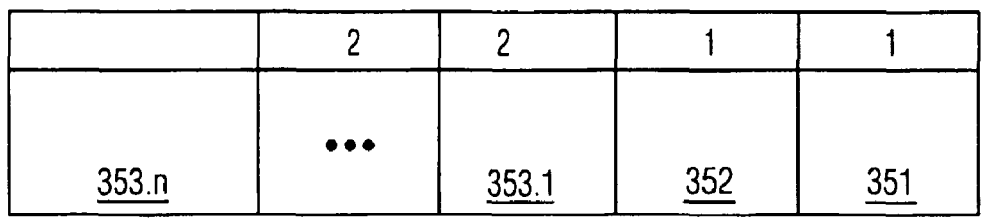

A device indicates the PM Mode in which it is operating using the Hibernation Information Element of its beacon illustrated in FIG. 3A.

The Hibernation Start field 303 of the Hibernation Information Element specifies the number of superframes remaining until the devices begin hibernation. When this field is 0, the device moves to a hibernation mode at the end of the current superframe. The purpose of the hibernation start field is that a device may signal in several consecutive superframes its intention to enter into a hibernation state. The value of the Hibernation Start field is decremented by 1 in every superframe until the field reaches the value of 0 and the Hibernation Phase begins in the following superframe.

The Hibernation Duration field 304 of the Hibernation Information Element in FIG. 3A specifies the number of consecutive superframes during which the device intends to hibernate.

If no Hibernation Information Element is present in the beacon, it is implied that the device is operating in the Active Mode. Prior to entering the Hibernation Mode a device has to release all reserved capacity in the superframe, the so-called Distributed Reservation Protocol (DRP) streams. The same applies to streams in which the device that is announcing a planned hibernation phase is the receiver of the stream. If the sender detects the announced hibernation of its receiver it releases the associated unicast reservations. In case that the hibernating device is a receiver of a multicast stream the stream does not need to be released, in order to keep serving the remaining receivers. Data that is intended for the contention-based access, called Prioritized Channel Access (PCA) also can not be sent or received during the hibernation phase. Such data must be buffered on the sender's side until the hibernating device has switched back into the Active Mode. A device that has pending data buffered for the hibernating device includes a Traffic Indication Map Information Element (TIMIE) with the DEVID of the hibernating device in its beacon in the superframes, in which the intended receiver is in an Active Mode (again), i.e., it is able to receive the beacon. If the intended receiver detects a TIMIE with its DEVID, it may, i.e., stay in the Active Mode instead of returning to the Hibernation Mode for another sleep period.

According to the present invention a hibernating device does not lose its beacon slot, even if it does not transmit a beacon in this beacon slot during the hibernation phase. This means that active devices that have received a hibernating announcement still consider the beacon slot of the hibernating device as occupied. In order to inform the two-hop neighbors of the hibernating device that the beacon slot is still occupied and to avoid newly-joining devices from gaining access to the beacon slot of the hibernating device, the one-hop neighbours of the hibernating device keep marking the respective beacon slot as occupied in their Beacon Period Occupancy Information Element (BPOIE).

The BPOIE is included in a beacon to report the perceived occupancy of all beacon slots in the corresponding Beacon Period of the superframe to all its neighbours. By informing all neighbours about occupied and non-occupied beacon slots, the neighbouring devices that receive the beacon can deduce which beacon slots are usable and which devices are parts of the network. The inclusion of the BPOIE is also required to avoid beacon collisions in hidden-station scenarios. A hidden-station scenario is a scenario in which two devices cannot hear each other but a third device (i.e., in-between the two other devices) can receive both devices. If the two devices that cannot hear each other have randomly chosen the same beacon slot, the beacons will collide at the third station, where both transmitted beacons superimpose and are therefore not receivable. This is why the third device will report the occupancy of the respective slot in its beacon, which will avoid that one of the two hidden devices (the one that joined the network later) chooses the same beacon slot than the other hidden device.

If a device does not receive a beacon from the hibernating device for mMaxLostBeacons superframes after the announced end of the hibernation phase, it marks in its BPOIE the beacon slot of the hibernating device as non-occupied again.

A hibernating device returns to the Active-State one or several superframes before the end of the hibernation phase. The reason is that the hibernating device must check whether its beacon slot is still free or whether another device has occupied the slot in the meantime. If the slot is occupied, the device must select a different slot, as if it were joining the network for the first time. Furthermore, the hibernating device must re-collect information regarding other devices' reservations of data slots in the data phase of the superframe, in case the hibernating device is planning to send or receive data after the end of the hibernation phase. Yet another reason is that the hibernating device may have lost synchronization to the beacon period and should re-synchronize one or several superframes before transmitting its beacon again.

Even devices that are operating in the Active Mode may save power. In contrast to hibernating devices, devices in the Active Mode cannot save power across several superframes 100 but only during a superframe 100. For this purpose devices in the Active Mode can go into a sleep state, called "Standard Power-Save State," after they have transmitted and received beacons as well as having transmitted and received any data.

Every device in the Active Mode must listen to the beacon period in order to send and receive beacons with beacon slot occupancy information, reservation information for the data phase of the superframe, etc. As the beacon period is, i.e., always at the beginning of the superframe, a device in the Active Mode must periodically awake. After the end of the beacon period, a device in the Active Mode can go into the Standard Power-Save State until the beginning of the next beacon period, if there is no pending data to send or receive during the superframe.

According to the present invention, if a device has pending traffic to send during a superframe it includes a TIMIE 350 in its beacon with the DEVID(s) of the intended receiver(s) of the data. This is how a device becomes aware that it must stay awake because another device has data pending for it, which must be received during the superframe.

If a device has its own data to send during the superframe or it has received a TIMIE 350, in which its DEVID was included, it must stay in the Awake State after the end of the beacon period until all transmissions and receptions have been completed. If the earliest starting time of the planned transmission or receptions is known the device may also go into the Standard Power-Save/sleep State until the beginning of the transmissions or receptions.

Figure 7:
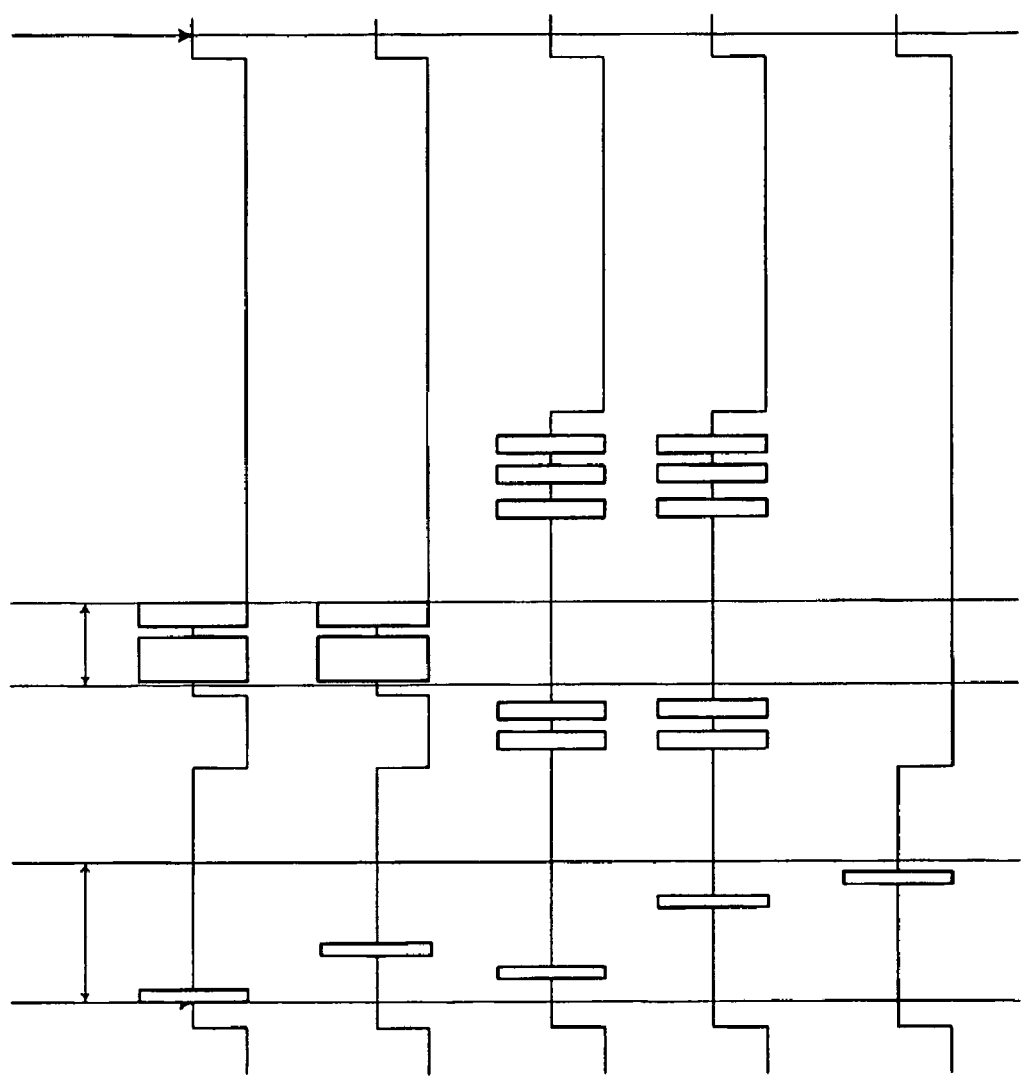
FIG. 7 illustrates Power State Transitions for devices in active mode.

Referring now to FIG. 7, power state transitions for devices in the Active Mode are described below:

DEV A depicts an Active Mode device that has data traffic pending to be transmitted in reserved timeslots in the current superframe.

DEV B depicts an Active Mode device that is expecting to receive a planned transmission in reserved time slots from DEV A in the current superframe.

DEV C depicts an Active Mode device that has data traffic pending to be transmitted with PCA in the current superframe.

DEV D depicts an Active Mode device that is expecting to receive a planned transmission with PCA from DEV C in the current super frame.

DEV E depicts an Active Mode device that does not have any traffic pending in its transmission queues, and it is not expecting any planned transmission from other devices.

The TIMIE can also be used to inform devices that have just switched back from the Hibernation Mode into the Active Mode that they should stay in the Active Mode to receive data. A device that does not have its own data to send and has just left the Hibernation Mode would probably switch back to the Hibernation Mode if no data has to be received. This would result in alternate Hibernation and Active Mode phases, where the hibernation phases would typically last several superframes, whereas the Active Mode phases would probably last only one or a few superframes. If during the Active Mode phase the device receives a TIMIE with its DEVID, the periodicity of the hibernation may be interrupted depending on the amount of data that must be received, because the device must stay in the Active Mode for a longer period of time.

If the data payload cannot be successfully transmitted within the superframe, i.e., the target device of the transmission goes into the Hibernation Mode before all the payloads can be transmitted, the Active Mode device continues to buffer the remaining traffic for the current hibernation duration of the hibernating device. However, the active mode device may also delete data when it has been buffered beyond a certain time-out value.

In a preferred embodiment of the present invention there is only one beacon period per superframe. However, there might be also embodiments of the invention where multiple beacon periods per superframe exist. In this case devices in the Active Mode, which have ongoing data streams, must wake up from Standard Power-Save State not only prior to their own beacon period but also prior to the beginning of other beacon periods, in which they do not transmit their own beacon. This is necessary, because devices with ongoing streams must check for the reservations of data slots by other devices and for reservation collisions, which might affect their own streams. Devices in the Hibernation Mode may not need to wake up for other beacon periods, as they have no ongoing streams.

While the preferred embodiments of the present invention have been illustrated and described, it will be understood by those skilled in the art that the management frame, device architecture and methods, as described herein are illustrative, and various changes and modifications may be made and equivalents may be substituted for elements thereof without departing from the true scope of the present invention. In addition, many modifications may be made to adapt to the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the appended claims.

We claim:

1. A wireless device that saves power by entering at least one of a hibernation or sleep mode, comprising:
   an antenna for sending and receiving messages over a wireless medium;
   a receiver coupled to the antenna to receive a message transmitted over the wireless medium;
   a transmitter coupled to the antenna to transmit messages over the wireless medium;
   a beacon processing module to perform beacon processing for the device;
   a processor to divide time into a sequence of at least one superframe having at least one beacon period and operatively coupled to:
   the transmitter and the receiver to send and receive data and respectively send and receive beacon frames announcing the intention of the device to hibernate and beacon frames indicating that other devices have pending data for the device,
   the beacon processing module to:
   process Hibernation Information Elements of received beacon frames of other devices and maintain therefrom a hibernation table of characteristics of the other devices;
   keep the device in an active mode if a received beacon announces pending data for the device;
   announce the intention of the device to enter a hibernation mode at a start time and for a sleep period; and
   periodically wake up the device when the device is hibernating to listen for beacons of other devices and to put the device back into a hibernation mode if other devices have indicated no pending traffic for the hibernating device in their beacons.

2. The device of claim 1, wherein the processor is further configured to:
   when the device is in an active mode, place the device into a sleep state during a superframe when there are no pending data transmissions for the device announced in the received beacons of other devices; and
   wake up the device from the sleep state at the beginning of each beacon period.

3. The device of claim 1, wherein the processor is further configured to:
   when the device is in an active mode, place the device into a sleep state during a superframe when the device has sent and received all data pending in the current superframe; and
   wake up the device from the sleep state at the beginning of each beacon period.

4. The device of claim 3, wherein the processor is further configured to:
   when the device is in an active mode, place the device into a sleep state during a superframe when the device is not involved in any of the transmissions that are announced in the beacons of other devices; and
   when the device has at least one active data stream, wake up the device from the sleep state at the beginning of: its own beacon period of the device; and beacon periods in which the device does not transmit its own beacon.

5. A method for saving power in a wireless communication network including a plurality of devices, comprising:
   dividing time into a sequence of at least one superframe having at least one beacon period;
   grouping beacons of different devices into at the least one beacon period;
   defining a sleep period as a plurality of superframes;
   by each device in the wireless network intending to enter a Hibernation mode, transmitting a beacon Hibernation Information Element, the Hibernation Information Element includes a Hibernation Start field and a Hibernation Duration field announcing a sleep period start time and a sleep period duration respectively; and
   hibernating in a hibernation mode during the announced sleep period duration, wherein a hibernating device does not transmit a beacon during the sleep period.

6. The method according to claim 5, further comprising:
   periodically waking up the hibernating device to listen for beacons of other devices; and
   returning the hibernating device to the hibernation mode if other devices have indicated no pending traffic for the hibernating device in their beacons.

7. The method of claim 5, further comprising:
keeping information on the presence of a beacon of the hibernating device in beacons of other devices during the announced sleep period duration of the hibernating device.

8. The method of claim 5, further comprising:
including the address of a device transmitting the beacon Hibernation Information Element in a beacon transmitted by another device in one of an information element and field when the other device has pending data for delivery to the transmitting device; and
maintaining the transmitting device in an active mode if a beacon with one of an information element and field including pending data for the transmitting device is received before the transmitting device hibernates.

9. The method of claim 5, wherein the sleep period start time is a number of future superframes relative to a current superframe.

10. The method of claim 5, further comprising:
including in the Hibernation Information Element a periodicity of the sleep period, wherein the periodicity is a sum of a number of superframes that the device will be in the hibernation mode and a number of superframes the device will be in an active mode, wherein the active mode is defined as the device not being in the hibernation mode.

11. The method of claim 5, further comprising:
announcing, when a device in an active mode has pending data to transmit to at least one intended receiver device, the pending data by including a Traffic Indication Map Information Element in a beacon of the device, wherein the Traffic Indication Map Information Element comprises at least the device addresses of the at least one intended receiver device of the pending data.

12. The method of claim 5, further comprising:
entering a device into a sleep state during a superframe when the device is in an active mode and when there are no pending data transmissions for the device that are announced in the beacons of other devices; and
waking up the device from the sleep state at the beginning of each beacon period.

13. The method of claim 5, further comprising:
entering a device into a sleep state during a superframe when the device is in an active mode and when the device has sent and received all data pending in the current superframe; and
waking up the device from the sleep state at the beginning of each beacon period.

14. The method of claim 5, further comprising:
entering a device into a sleep state during a superframe when the device is in an active mode and when the device is not involved in any of the transmissions that are announced in the beacons of other devices; and
waking the device up from a sleep-mode at the beginning of its own beacon period, and at the beginning of beacon periods in which it does not transmit its own beacon when the device has at least one active data stream.

15. A communications network including a plurality of devices that save power by announcing hibernation in their beacon frames by performing the power-saving method of claim 5.

* * * * *